(12) United States Patent
Shetty et al.

(10) Patent No.: US 9,336,188 B2
(45) Date of Patent: *May 10, 2016

(54) GENERATING A STATISTICAL TREE FOR ENCODING/DECODING AN XML DOCUMENT

(75) Inventors: Rohit Shetty, Bangalore (IN); Umesh Kumar Balaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1150 days.

This patent is subject to a terminal disclaimer.

(21) Appl. No.: 13/010,900

(22) Filed: Jan. 21, 2011

(65) Prior Publication Data
US 2011/0119315 A1    May 19, 2011

Related U.S. Application Data

(62) Division of application No. 11/561,043, filed on Nov. 17, 2006, now Pat. No. 7,886,223.

(51) Int. Cl.
*G06F 17/00* (2006.01)
*G06F 17/22* (2006.01)

(52) U.S. Cl.
CPC ........ *G06F 17/2229* (2013.01); *G06F 17/2247* (2013.01)

(58) Field of Classification Search
CPC .......................... G06F 17/2247; G06F 17/2252
USPC ........................................................ 715/234
See application file for complete search history.

(56) References Cited

U.S. PATENT DOCUMENTS

| | | | |
|---|---|---|---|
| 6,300,947 B1 * | 10/2001 | Kanevsky | G06F 17/30905 707/E17.121 |
| 7,200,805 B2 * | 4/2007 | Carlson et al. | 715/237 |
| 7,281,018 B1 * | 10/2007 | Begun et al. | |
| 7,467,149 B2 * | 12/2008 | Gaurav et al. | |
| 7,533,102 B2 * | 5/2009 | Kalia et al. | |
| 7,533,122 B2 * | 5/2009 | Drumm et al. | |

(Continued)

OTHER PUBLICATIONS

Bohannon et al., From XML Schema to Relations: A Cost-Based Approach to XML Storage, IEEE 2002, pp. 1-12.*

(Continued)

*Primary Examiner* — Cong-Lac Huynh
(74) *Attorney, Agent, or Firm* — Eustace P. Isidore; Yudell Isidore PLLC

(57) ABSTRACT

A method and apparatus for generating a statistical tree representing an extensible markup language Schema (XSD) is disclosed. Components of the XSD are prioritized according to predefined rules. A root node representing said XSD is created. Pairs of child nodes are generated from the root node. Each pair comprises at least one genuine node, and each pair of generated child nodes is appended to a parent node which is a genuine node. The path to each of said child nodes from a respective parent genuine node is represented with a binary sequence. At least one genuine node is allocated to a corresponding component of said XSD, the allocation being based on the prioritization of the component. Methods, apparatus and computer program products for generating a statistical tree representing an extensible markup language Schema (XSD), for encoding an extensible markup language (XML) document utilizing a statistical tree representing an extensible markup language Schema (XSD), and for decoding an XML document represented by a binary encoded sequence also are disclosed.

16 Claims, 13 Drawing Sheets

(56) References Cited

U.S. PATENT DOCUMENTS

| | | | |
|---|---|---|---|
| 7,747,469 B2* | 6/2010 | Hinman | 705/26.81 |
| 7,844,633 B2* | 11/2010 | Miszczyk et al. | 707/797 |
| 7,895,137 B2* | 2/2011 | Salahshour | G06F 9/542 |
| | | | 706/12 |
| 7,925,643 B2* | 4/2011 | Balegar | G06F 17/227 |
| | | | 707/713 |
| 8,121,976 B2* | 2/2012 | Kalia et al. | 707/601 |
| 8,190,991 B2* | 5/2012 | Sampathkumar et al. | 715/237 |
| 8,516,140 B2* | 8/2013 | Bakker et al. | 709/230 |
| 8,739,022 B2* | 5/2014 | Chiu et al. | 715/234 |
| 9,002,691 B2* | 4/2015 | Richards | G05B 23/0248 |
| | | | 703/13 |
| 2003/0172193 A1* | 9/2003 | Olsen | 709/315 |
| 2010/0049727 A1* | 2/2010 | Balegar | G06F 17/2252 |
| | | | 707/693 |
| 2010/0191567 A1* | 7/2010 | Lee | G06Q 10/063 |
| | | | 705/7.11 |

OTHER PUBLICATIONS

Levy et al., Deep Dependencies from Context-free Statistical Parsers: Correcting the Surface Dependency Approximation, ACM 2004, pp. 327-334.*

* cited by examiner

GENERATING A STATISTICAL TREE FOR ENCODING/DECODING AN XML DOCUMENT

PRIORITY CLAIM

The present application is a divisional of U.S. patent application Ser. No. 11/561,043, titled "Generating a Statistical Tree for Encoding/Decoding an XML Document," filed on Nov. 17, 2006. The content of that application is incorporated by reference herein.

FIELD OF THE INVENTION

The present invention relates to encoding of structural content, and in particular to the encoding of structural content in Extensible Markup Language (XML) documents.

BACKGROUND

Structural information may be defined by a document written in a markup language, such as extensible markup language (XML). XML specifies both structure and content of a document, at the expense of significant redundancy. The simplicity and the ease of representing data in XML has resulted in an increasing move to utilize XML across different domains, ranging from databases to web applications. XML documents tend to be quite large compared to other forms of data representation, which reduces the performance of such documents, such as increased transmission requirements. Therefore, it is desirable that an efficient XML document encoding technique be developed to minimize data storage requirements and improve processing performance.

One approach taken by existing techniques involves restructuring the document and performing generic text compression on the restructured document. Generally, this approach yields superior results when compared with performing text compression directly on the original XML document. Other techniques utilize the XML Schema (XSD) to create a 'map' of the XML document, which allows references to the elements and attributes to be replaced with codes that significantly reduce the size of the document, and may be further assisted by subsequently performing generic text compression on the mapped XML document.

A disadvantage with the above techniques is that they do not effectively utilize the inherently well-defined structure of the XML document to provide more effective compression. Whilst some of the techniques do make an effort to use the structural details, this only occurs as a pre-processing exercise before the next level of, usually, text-based compression. Therefore, a need exists to provide an algorithm to overcome these problems and utilize the XML structure to improve the compression ratio.

SUMMARY

A method for generating a statistical tree representing an extensible markup language Schema (XSD) is disclosed. Components of the XSD are prioritized according to predefined rules. A root node representing said XSD is created. Pairs of child nodes are generated from the root node. Each pair comprises at least one genuine node, and each pair of generated child nodes is appended to a parent node which is a genuine node. At least one genuine node is allocated to a corresponding component of said XSD, the allocation being based on the prioritization of the component.

The path to each of the child nodes from a respective parent genuine node can be represented with a binary sequence.

A method for encoding an extensible markup language (XML) document utilizing a statistical tree representing an extensible markup language Schema (XSD) is also disclosed. A root node of the statistical tree is established. Each of a plurality of fragments of said XML document are sequentially selected. A genuine node in said statistical tree corresponding to each of said selected fragments is located. The genuine node has properties corresponding to said respective fragment. A binary code representing a path of traversal through said statistical tree to said corresponding genuine node from said root node is determined. The binary code is ordered in accordance with the sequence of the respective fragments in the XML document. Each located genuine node is analyzed to determine the type of node, and the determined type is utilized to establish a new root node for encoding the sequentially next fragment of the XML document.

A method for decoding an XML document represented by a binary encoded sequence also is disclosed. A root node is established in a statistical tree representing an XSD of the XML document. The statistical tree is traversed from said designated root node to locate a next genuine node, the traversal based upon at least one portion of the binary encoded sequence bits. A fragment of the XML document is generated, the fragment corresponding to the located genuine node. The generated fragments are ordered in accordance with the order of the corresponding bits in the binary sequence. Each genuine node is analyzed to determine the type of the node, the type of node determining if a new root node is to be designated for traversing the statistical tree in according with the bits corresponding to the sequentially next at least one portion of said binary encoded sequence.

Apparatus and computer program products for generating a statistical tree representing an extensible markup language Schema (XSD), for encoding an extensible markup language (XML) document utilizing a statistical tree representing an extensible markup language Schema (XSD), and for decoding an XML document represented by a binary encoded sequence also are disclosed.

BRIEF DESCRIPTION OF THE DRAWINGS

One or more embodiments of the present invention will now be described with reference to the drawings and appendices, in which.

DETAILED DESCRIPTION

Figure 1:
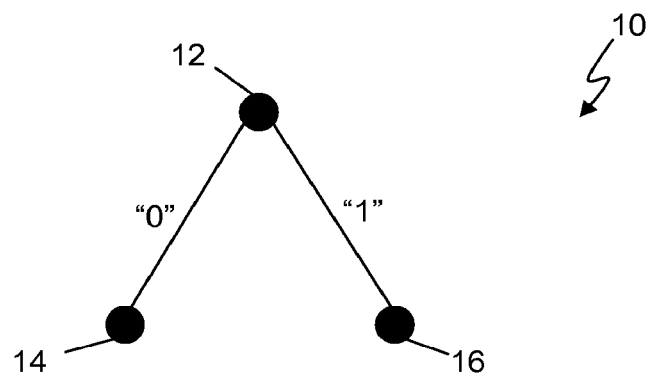
FIG. 1 is a diagram of a statistical tree.

Where reference is made in any one or more of the accompanying drawings to steps and/or features, which have the same reference numerals, those steps and/or features have, for the purposes of this description, the same functions or operations, unless the contrary intention appears.

Introduction

Information in a XML document in presented in a structured manner according to an XML Schema (XSD). The XSD defines the rules which govern the organization of the elements, attributes and enumerated data which may appear in a corresponding XML document. A single XSD may be common across multiple XML documents. By analyzing the content of an XSD, it is possible to create a path-based statistical tree representing the structure defined by the XSD. Such a path-based tree also may be utilized to encode an XML document whose structure adheres to the same XSD. Encoding allows the structure and enumerated data to be compressed and represented by a binary sequence of bits. Non-enumerated data is not compressed by the encoding processes, but may be compressed using regular text compression, if necessary. By ensuring that the encoding of the structured content of the XML document is independent from the storage of the non-enumerated data, performing various operations on the encoded document, such as querying for data is still possible. Decoding the encoded document requires traversing the statistical tree is in accordance with the encoded binary sequence and retrieving stored, uncompressed data.

Statistical Tree Generation

A statistical tree can be generated from an XSD, which may then be used in the encoded and decoding of any XML document which has structural content complying with the XSD. An XSD expresses shared vocabularies and defines the structure, content and semantics of an XML document which utilizes that particular XSD. A statistical tree captures the information defined by the XSD by representing the elements, attributes and enumerations as branches, nodes and leaves of a statistical tree. The elements, attributes and enumerations of an XSD or corresponding XML document may be referred to as the components of the XSD. Traversing the paths between nodes of a statistical tree can be represented by binary sequences, which therefore can be interpreted to describe the structure of the XSD.

In the present disclosure, reference is made to the generation of a number of statistical trees in respect of a single XSD (e.g. a schema tree and various type trees). As will be described, during encoding and decoding of an XML document the statistical tree, representing the XSD of the corresponding XML document, is traversed. If, during this traversal, a leaf node in the statistical tree is encountered, an instance of a corresponding type tree is merged with that leaf node, wherein the corresponding type tree is dependant upon the XML component represented by the leaf node.

The generation of statistical type trees according to an embodiment of the present invention requires the prioritization of components identified in the XSD. The prioritization is performed according to a predefined set of rules. The rules which are utilized may be based upon criteria such as the probability of occurrence of a component (i.e. based upon the minimum and/or maximum number of occurrence attributes defined in the XSD), or even the number of characters representing the component name. Preferably, the criteria applied should be applicable to all components. The rules should be defined so that the number of bits required to represent the most common elements, enumerations and attributes, during encoding, are minimized.

According to one implementation, the rules for generating a statistical tree are:
1. All components in the XSD are assigned a priority based upon the maximum number of times they can occur in the XML document. A higher maximum occurrence will be assigned a higher priority level.
2. If multiple components are assigned the same priority level according to the above rule, then these components are further prioritized according to the minimum number of occurrences of each component. A higher minimum occurrence will be assigned a higher priority level.
3. If multiple components are assigned the same priority level after applying rule Nos. 1 and 2, then the priority of these components are assigned based on the length of name of the XML component. Longer names will be assigned a higher priority.
4. If after applying the above rules, there are components with the same priority, then those components are randomly sorted and a priority is assigned.

FIG. 1 is a tree diagram 10 comprising a single parent node 12, and a pair of child nodes 14, 16. The path from the parent node 12 to the child node 14 or 16, along the tree branch 10, may be assigned a binary '0' or '1' as illustrated. The designation of the binary representation along the paths from the parent node 12 to the child nodes 14, 16 is arbitrary, and may be interchanged, provided that the designation is applied consistently throughout the generation of the statistical type trees for the XSD and the subsequent encoding and decoding utilizing the generated statistical tree. Hereafter, it will be assumed that the designation applied in FIG. 1 is adhered to. Therefore, all references to traversing from a parent node to a child node along a path represented by a '0' will indicate following the path to the 'left' peer child node. Similarly, traversing from a parent node to a child node along a path represented by a '1' indicates following the path to the 'right' peer child node. The left and right child nodes 14, 16 may be referred to as "peer" nodes of one another. In the present disclosure, any node of a statistical type tree that represents an XML element, attribute or enumeration is known as a "genuine" node.

Figure 2:
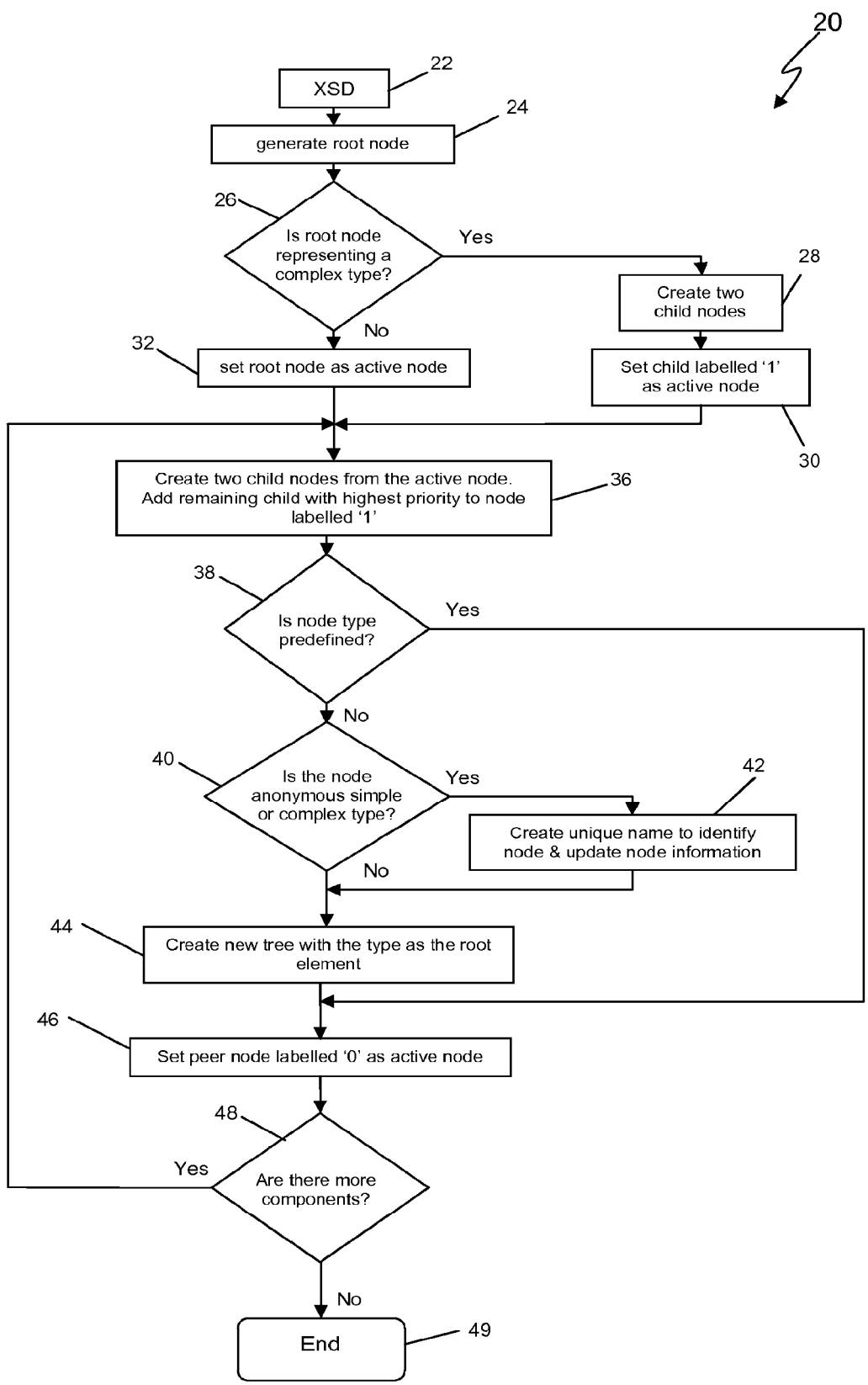
FIG. 2 is a flow diagram of a method for generating a statistical tree.

FIG. 2 illustrates a method 20 for generating a statistical tree according to an embodiment of the present invention. The XSD 22 is firstly parsed and a root node generated (Step 24). Each node, when generated, is assigned the properties of the corresponding XSD component, as those properties are defined in the XSD. The properties of the node are analyzed to determine the type of component represented by the node (Step 26). If the node represents a component of a complex type, two child nodes are created from the node (Step 28) and one of the child nodes is set as the active node (Step 30). In a preferred implementation, the child node represented by a binary '1' is designated as the active node. If, on the other hand, at Step 26 it is determined that the node does not represent a complex type component, then the root node is set as the active node (Step 32). The active node sets the point from which further branches, leaves and nodes of the statistical tree are to be generated.

As previously described, it is possible to prioritize elements, attributes and enumerations (all of which are examples of "components") of a XSD according to predefined rules. The process of generating a statistical type tree makes use of the prioritization of components by generating child nodes representing elements, attributes and enumerations with a higher priority before elements, attributes and enumerations which are assigned a lower priority.

From the active node assigned at Step 30 or 32, two child nodes are generated (Step 36) and, as for all generated nodes, the path from the parent node to each of the child nodes is designated with a binary number. The component with the highest priority is assigned to one of the child nodes (Step 36) and the properties of the assigned element, attribute or enumeration are allocated to the corresponding node. According to the embodiment described herein, the component is assigned to the child node whose path from the parent is represented by a binary '1'. The allocated properties of the assigned node are analyzed, and the type of the node is determined (Step 38). If the type of the assigned node is predefined, the unassigned child node generated at Step 36 is set as the active node (Step 46). In the present embodiment, the child node whose path from the parent of the assigned node is represented by a binary '0' is set as the active node (Step 46). If the assigned node (in Step 36) in not predefined, the properties of the node are further analyzed to determine if it is of an anonymous complex type or simple type (Step 40). If the assigned node is found to be of an anonymous complex type or simple type, then a unique name is created to identify the type of the node, and the node properties are updated (Step 42) to refer to the unique identifier. If the assigned node is not of an anonymous type, or once the creation of the unique identifier (Step 42) has occurred, then a type statistical tree is generated (Step 44) for that complex or simple type. Once the statistical type tree has been generated (Step 44), the unassigned child node generated at Step 36 is set as the active node (Step 46). In the present embodiment, the child node whose path from the parent node of the assigned node is represented by a binary '0' is set as the active node (Step 46). The XSD is then analyzed to determine if there are further component to be assigned to nodes in the statistical tree (Step 48). If there are further components to be assigned, method Steps 36-48 are performed recursively. If there are no further components to be assigned to nodes, then the generation of the statistical type trees is complete (Step 49).

Any enumeration, element or attribute in the XSD which has a reference to some other enumeration, element or attribute will be considered to be of the referenced type, whose properties are a combination of own and referenced type properties, with own values being assigned higher priority.

Figure 3:
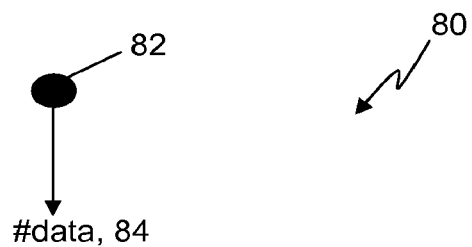
FIG. 3 is a diagram of a leaf node indicating that data is to be retrieved from storage.

When generating the statistical tree it may be necessary to represent data that would generally be present in the XML document. When traversing the statistical trees, data will need to be retrieved whenever a predefined XML type is encountered. This may be represented in the statistical type tree as shown in FIG. 3. Each time a node 82 is reached with the '#data' leaf 84, non-enumerated data is to be retrieved from data storage.

Figure 4:
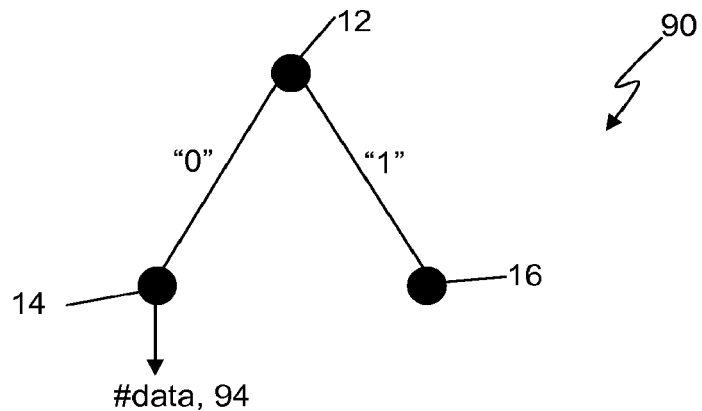
FIG. 4 is a diagram of a node of complex type node defining mixed content.

Another situation may arise when a generated node is a complex type defining mixed content. This is represented by having a mixed="true" property for the node which is a complex type. FIG. 4 illustrates the formation of a statistical tree 60 having a root node 32 being a complex type defining mixed content. A "#data" leaf 62 is attached at the last '0' node 14, as shown, to indicate that data has to be fetched every time the node is reached, whilst the remaining child node 16 can be assigned to a component of the XSD as has been previously discussed.

During the building of the statistical tree, the nodes representing components carry all the properties associated with the corresponding elements, attributes or enumerations in the XSD. This means that it will also carry information regarding the namespaces in the document. Due to this, during the encoding process we can normalize (perform a one-one mapping) of the namespaces between the XML document and the XSD, and neglect the namespaces while creating the decoded document codes. This means that the code generated for the decoded XML document does not carry any namespace information. During the process of decoding the required namespace information can be added to the XML document from the statistical tree as, and when, required.

In some circumstances, the "any attribute or element" may be defined in the XML Schema. Such an element allows an XML document to extend the main Schema by adding elements and attributes of its own. This is a unique situation as these elements will not be found in the XSD unless a separate namespace has been explicitly defined to declare it. To overcome any problems which may arise in this situation, an occurrence of the "any" attribute or element without a separate namespace declaration and a corresponding XSD will be handled by a "#data" node in the statistical tree that will signify that data has to be fetched from the store or that the element/attribute pertaining to this will have to be stored as-is in the store. The same policy will have to be followed if the "processContents" for any attribute/element has been set to skip, which means that the XSD does not want such a XML sequence to be processed. Generally "any" attributes and elements are associated with "processContents=skip".

Structural Encoding Using the Statistical Tree

The statistical type trees representing the element, attributes and enumerations in an XSD are utilized when encoding an XML document which conforms with the same XSD. The process of encoding involves traversing the statistical tree with reference to the XML document being encoded, and representing each of the attributes, elements and enumerated data appearing in the XML document with a binary representation of the paths traversed through the statistical tree to reach the nodes corresponding to the attribute, element or enumeration fragment being encoded.

Figure 5:
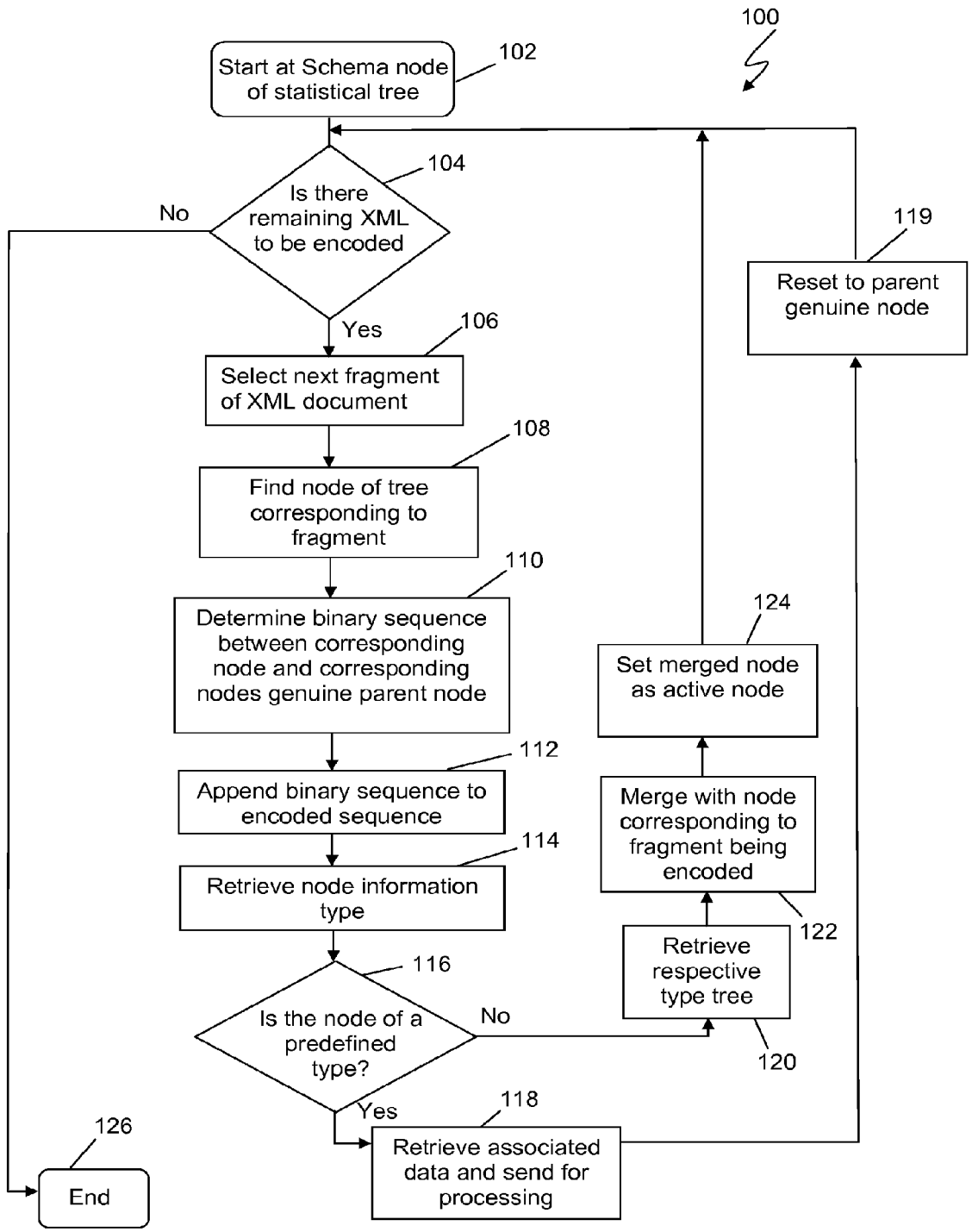
FIG. 5 is a flow diagram of a method for encoding an XML document utilizing a statistical tree.

FIG. 5 is a flow diagram 100 illustrating the process of encoding an XML document using a statistical tree corresponding to the XSD of that document. Each traversal begins at the root node of the statistical tree labeled "Schema" (Step 102). Typically, when a leaf node is reached (in the preferred embodiment, this usually occurs by traversing a path to a node representing that data is to be sent to be stored or processed, and is illustrated as a "#data" node), the traversal will 'reset' to the parent genuine node. An exception to this situation occurs when all the children of a particular node have been encoded, and the traversal will reset to the parent genuine node of the root node of the type tree being encoded. This occurs when the traversal path to a leaf node is represented by a '0', recalling the earlier designation of paths between parent and child nodes.

The XML document to be encoded may be considered as comprising a number of 'fragments', with each fragment being an instance of an element, attribute or enumerated data. The XML document is analyzed to determine if there are remaining fragments which require encoding (Step 104). If there is at least one remaining XML fragment of the document to be encoded, that next one fragment is selected (Step 106). The statistical tree is searched to find the node corresponding to the selected fragment (Step 108). Once the corresponding node has been found, the binary sequence representing the traversal is determined, being the sequence from the corresponding node's genuine parent node to the corresponding node (Step 110). This sequence is then appended to any preceding binary encoded sequence (Step 112). If there is no preceding sequence, a new sequence is commenced. As each node is allocated the properties of the element, attribute or enumerated data to which that node corresponds, the type information, including if it is a predefined type, can be determined by analyzing the node (Step 116). If the node is of a predefined type, the associated data is retrieved and sent for processing (Step 118). In doing so, the traversal resets to the parent genuine node (Step 119). If, on the other hand, the node is not of a predefined type, then the type of the node is determined, and an instance of the respective statistical type tree is retrieved (Step 120). The retrieved type tree is then merged with the node corresponding to the node for the XML fragment presently being encoded (Step 122). The merged node of the retrieved type tree is then set as the active node (Step 124). The preceding steps 104-124 may then be repeated recursively for each subsequent fragment of the XML document to be encoded. When an end tag of a element, attribute or enumeration is detected in the XML document, the traversal resets to the genuine parent node of the root node by traversing, for example in the preferred binary representation, the 'all zero' path, being the path from a root node to a leaf node via a path represented only by binary '0's. Once the encoding reaches the end of the XML document, and it is determined (at Step 104) that there is no further fragments to be encoded (i.e. the end tag corresponding to the Schema root node is detected), then the encoding is complete (Step 126).

Decoding Using the Statistical Tree

The statistical trees and binary representation of the encoded XML document are utilized for the process of decoding. Decoding involves traversing the statistical tree in accordance with the sequence of bits in the encoded binary sequence, and generating the corresponding elements, attributes and enumerated data fragments to produce the decoded XML document structure. The structure and data retrieved from storage, when combined, produce the decoded XML document.

Figure 6:
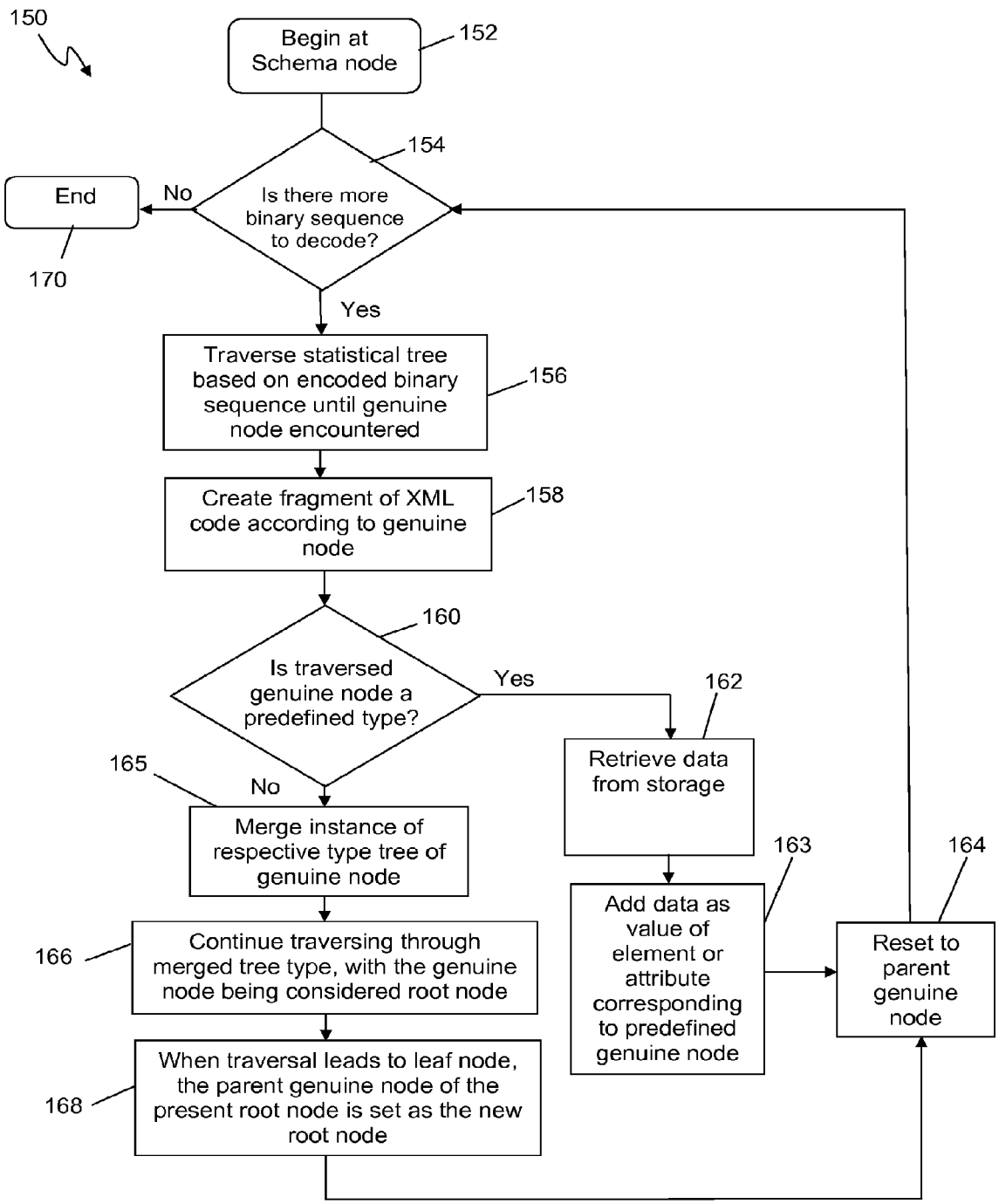
FIG. 6 is a flow diagram of a method for decoding a XML document binary encoded sequence.

FIG. 6 is a flow diagram 150 of a sequence of events which may occur when decoding the binary sequence representing an encoded XML document, such as a document produced according to the method steps illustrated in FIG. 5. The decoding process requires the use of the statistical tree which was utilized to perform the corresponding encoding. The decoding traversal of the statistical tree begins at the root node "Schema" (Step 152). The encoded binary sequence is checked to determine if there is remaining data to be decoded (Step 154). If there is further decoding to be performed, the paths of the statistical tree are traversed based upon the encoded binary sequence until a genuine node is encountered (Step 156). A fragment of XML document is then generated, being a fragment corresponding to the element, attribute or enumeration assigned to the genuine node, and having properties matching those attributed to the genuine node (Step 158). The type of the genuine node is then analyzed to determine if the traversed genuine node is a predefined type (Step 160). If the node is of a predefined type, the data is retrieved from the storage and added to the XML document as the value of an element or attribute (Step 162), or if the predefined type refers to a value, the value is added as a text value in the XML document (Step 163). The traversal then resets to the parent genuine node (Step 164), and the decoding continues from Step 154. If, on the other hand, at Step 160, it is determined that the traversed genuine node is not a predefined type, then the type of the node is ascertained from the allocated node properties, and an instance of the respective type tree is merged with the genuine node (Step 165). The genuine node is set as the root node, and the traversal of the type tree based on the subsequent binary encoded sequence continues (Step 166). When the traversal leads to a leaf node the traversal resets to the root node (Step 168). If the path of traversal leads to a leaf node whose path from the root node is represented by '0's only, then the traversal resets to the parent genuine node of the root node, and the parent genuine node is set as the new root node, from which the Traversal Continues.

Example

Statistical Tree Generation

An Example XSD is provided as Appendix A, and will form the basis of an example illustrating one implementation of performing the steps of generating a statistical tree, encoding and decoding an XML document using the same.

Figure 7:
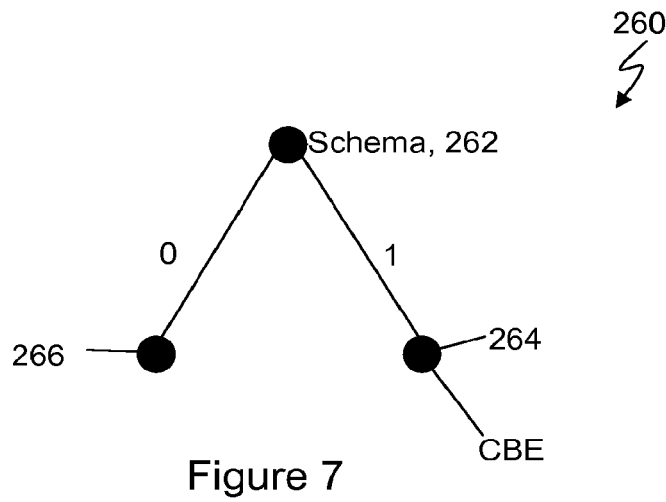
FIG. 7 is a diagram of a portion of a statistical tree for the XSD of Appendix A.

FIG. 7 illustrates the first portion of the statistical tree generated for this XSD. The XSD is parsed and the root node of the statistical tree is set as Schema. The XSD of Appendix A has only one element, in this instance named "CBE", and therefore the root node 262 is set as the active node. Two child nodes 264, 266 are generated from the root node 262, and the XSD component with the highest priority (determined according to the aforementioned rules) is allocated to one of the two generated child nodes. According to this implementation, the element is assigned to the node 264 whose path from the parent is designated by a binary '1'. Since the only component is the element "CBE", this has the highest priority, and is assigned to the node 264. As with the Schema node 262, this "CBE" node 264 is allocated all the properties defined for the corresponding element in the XSD.

The properties of the "CBE" node 264 of the statistical tree of FIG. 7 are analyzed, and it is determined that it is not a pre-defined type, nor is it an anonymous simple or complex type. Therefore, according to Step 44 of FIG. 2, a type tree is generated.

Figure 8:
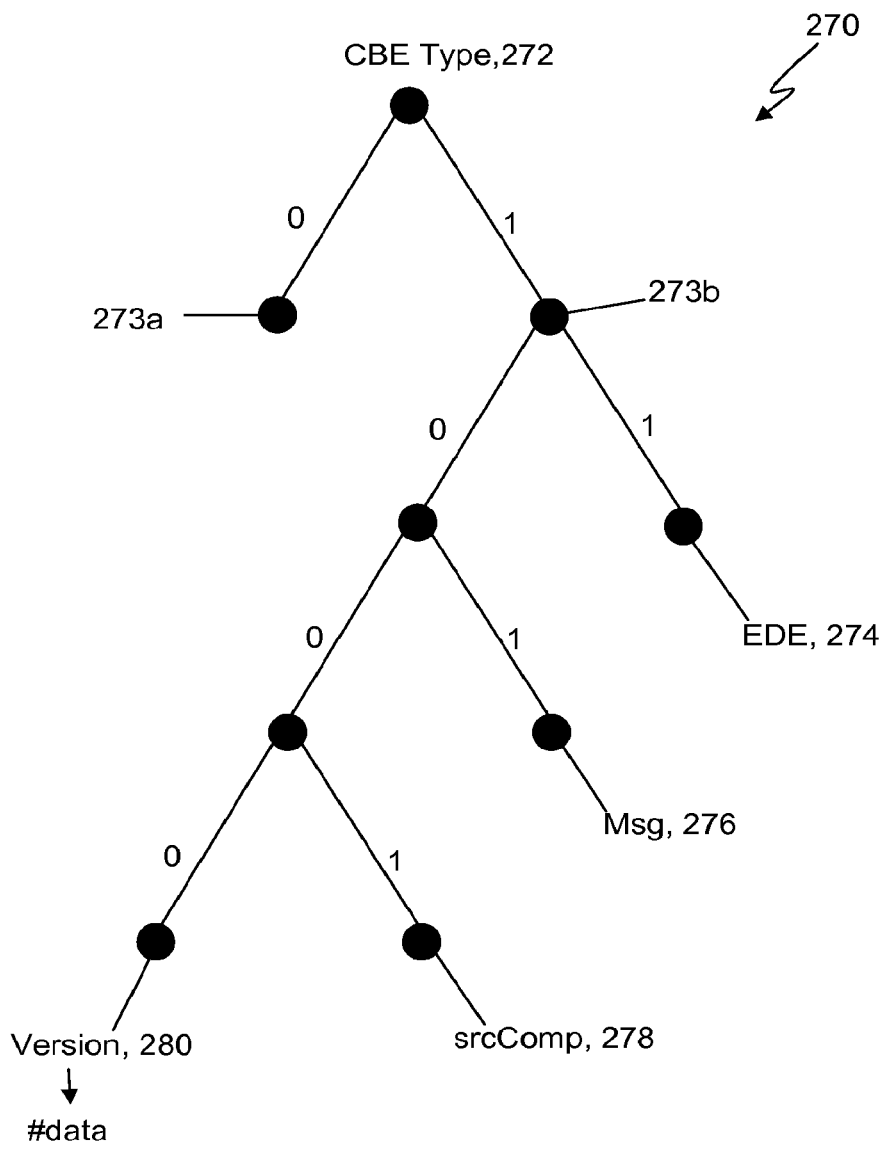
FIG. 8 is a diagram of a portion of a statistical tree for the XSD of Appendix A.

FIG. 8 is a statistical type tree 270 generated for the XSD of Appendix A according to the method steps illustrated in FIG. 2. A root node 272 is firstly generated, whose type is determined with reference to the properties of the "CBE" node—in this instance it is assigned the type "CBEType". Considering the XSD, the root node represents a complex type, having two child elements and two attributes, is therefore a complex type, and thus child nodes 273a and 273b are generated, with node 273b being set as the active node. The elements and attributes are prioritized according to the rules, resulting in the components being prioritized in the order "EDE" 274, "msg" 276, "srcComp" 278 and "version" 280 being from highest priority to lowest priority, respectively. The statistical type tree for "CBEType" 272 is then generated following the remaining Steps 36-48 of FIG. 2, and is shown in FIG. 8.

Figure 9:
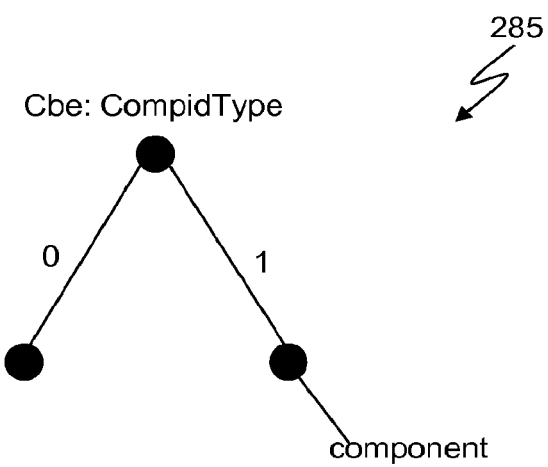
FIG. 9 is a diagram of a portion of a statistical tree for the XSD of Appendix A.

The "version" node 280 illustrated in FIG. 8 is of the basic xml type "xsd:String" and it has a direct reference from the version node 280 indicating that each time the version leaf node 280 is reached, data is to be retrieved from storage. The element "srcComp" 278 is of the type "Cbe:CompIdType", and a type tree is generated according to the method steps illustrated in FIG. 2, with the resulting type tree 285 being illustrated in FIG. 9. Similarly, FIG. 10 illustrates a type tree 290 generated in respect of the element "EDE" 274 appearing in statistical tree of FIG. 8, whose type is indicated by the root node "EDEType" 292.

Figure 10:
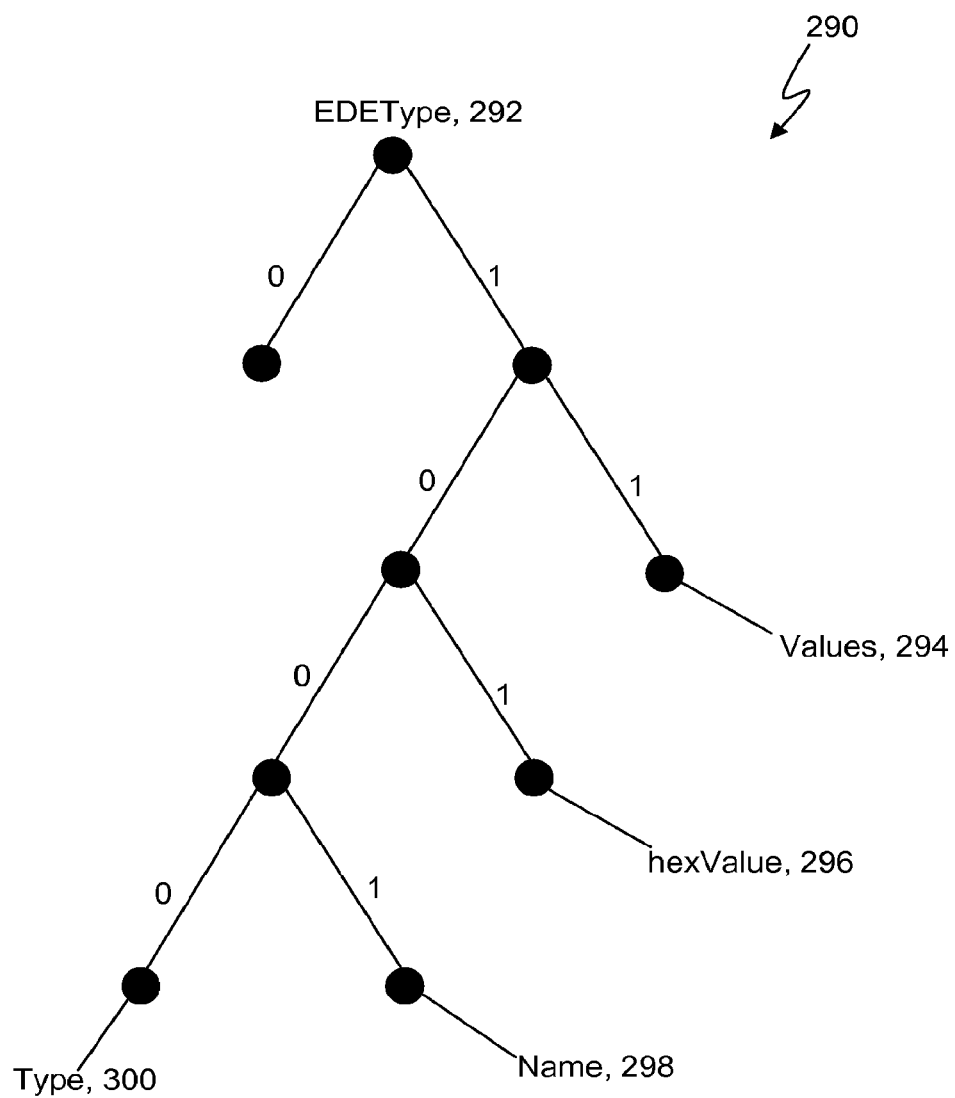
FIG. 10 is a diagram of a portion of a statistical tree for the XSD of Appendix A.

Furthermore, making reference again to the XSD illustrated in Appendix A and the type tree 290 of FIG. 10, the node assigned "type" 292 is of a simple anonymous type. When generating a type tree in reference to this particular node, a unique name is generated to identify the type tree (Step 42 in FIG. 2), and the type properties assigned to the node "type" 292 in FIG. 10 are updated to refer to the unique identifier. These are: "values" 294, "hexValue" 296, "name" 298, and "type" 300.

Figure 11:
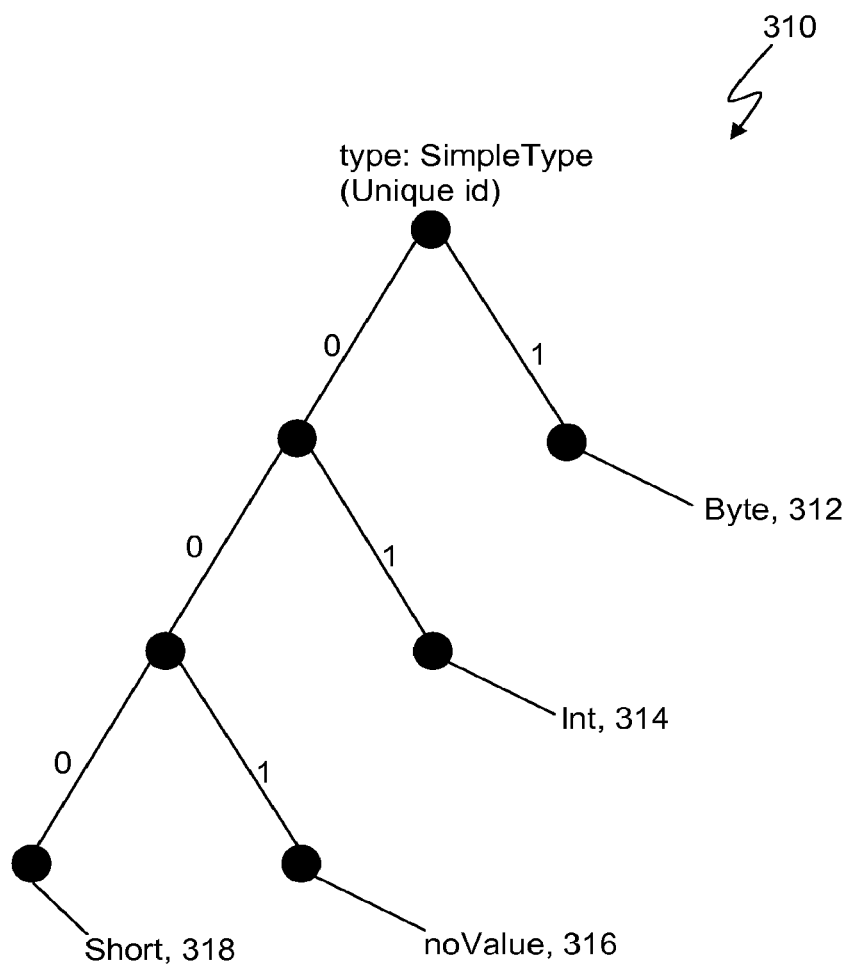
FIG. 11 is a diagram of a portion of a statistical tree for the XSD of Appendix A.

FIG. 11 illustrates a type tree 310 which is generated for one possible generated unique identifier. Each of the children "byte" 312, "int" 314, "noValue" 316 and "short" 318, are enumerations and are added to the type tree 310 according to the method steps of FIG. 2.

Figure 12:
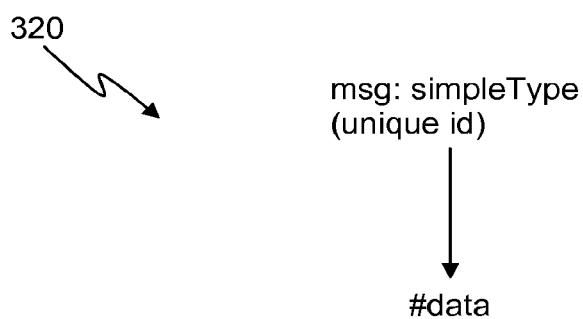
FIG. 12 is a diagram of a portion of a statistical tree for the XSD of Appendix A.

Referring again to FIG. 8, the attribute "msg" is an anonymous simple type which also requires the generation of a unique type tree identifier which, in this particular example, is "msg:simpleType". FIG. 12 illustrates the type tree 320 that is generated for this simple type, in accordance with the designation shown in FIG. 2. Each time the "msg:simpleType" type tree 320 is traversed, data will need to be retrieved from storage.

The statistical trees illustrated in FIGS. 7-12 are the generated complete set of statistical trees that define the structure of the specified XSD. When merged together, they may be considered as a single statistical tree which wholly defines the structure of the XSD.

Example

Structural Encoding Using the Statistical Tree

Figure 13:
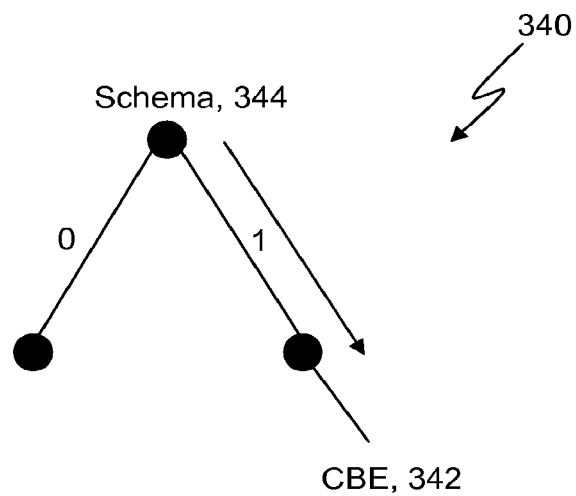
FIG. 13 is a diagram illustrating the traversal of a statistical tree to encode the XML document of Appendix B.

A sample XML document to be encoded is provided as Appendix B. The encoding of the XML document begins by traversing the statistical tree with the Schema root node, as illustrated in FIG. 7. The first fragment of the XML document to be encoded is the element "CBE". The path through the Schema statistical tree 340 to the genuine node representing the element "CBE" 342 is illustrated in FIG. 13, and the path between the root node 344 and the node representing the element "CBE" 342 is represented by a binary '1'.

Considering the allocated properties of the element "CBE" 342, it is determined that the node is not of a predefined type, and the respective type tree is retrieved and merged with the Schema statistical tree. In this example, the type tree is the "CBEType" type tree 270, as previously illustrated in FIG. 8. The genuine node 272 of the "CBEType" type tree 270 is set as the root node, and the encoding of the XML document may proceed.

Figure 14:
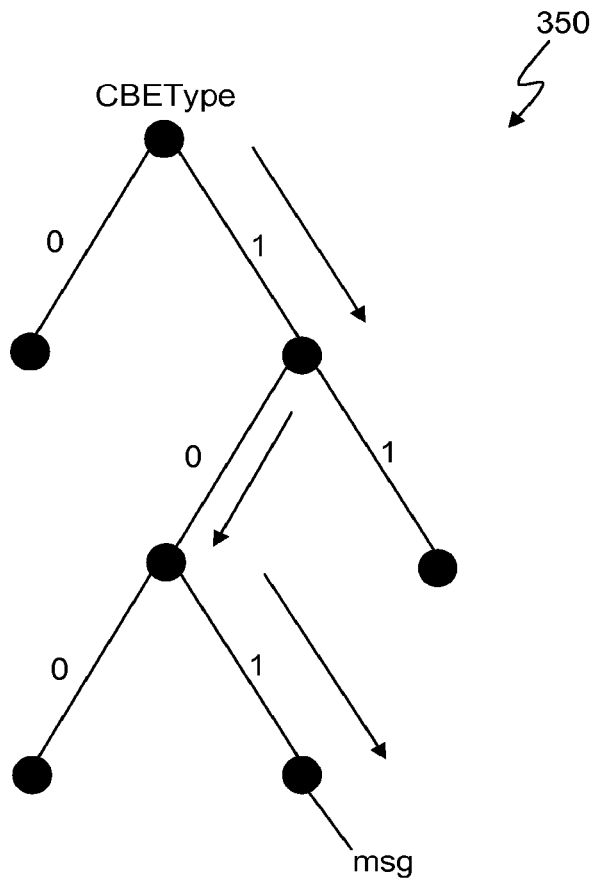
FIG. 14 is a diagram illustrating the traversal of a statistical tree to encode the XML document of Appendix B.

The next fragment to be encoded is the "msg" attribute whose associated node 276 can be reached by traversing the merged "CBEType" type tree 350 as illustrated in FIG. 14. The path to the "msg" node 276, from the root "CBEType" node 272 is represented by the binary sequence '101', which may be appended to the previously encoded sequence of '1' (for the encoding of the element "CBE") to produce the cumulative binary encoding '1101'. The properties of the "msg" node 276 identify that the node is a simple type, and the corresponding type tree, which is the "msg:simpleType" type tree 320 in FIG. 12, should be retrieved and merged with the "msg" node 276. The "msg:simpleType" type tree 320 has only a single leaf node indicated data needs to be fetched from storage. Therefore, as a leaf node requiring data retrieval has been reached, the traversal resets to the "CBE" node, being the genuine parent node of the root "CBEType" node 272. The "CBE" node is set as the root node, and the encoding continues.

Figure 15:
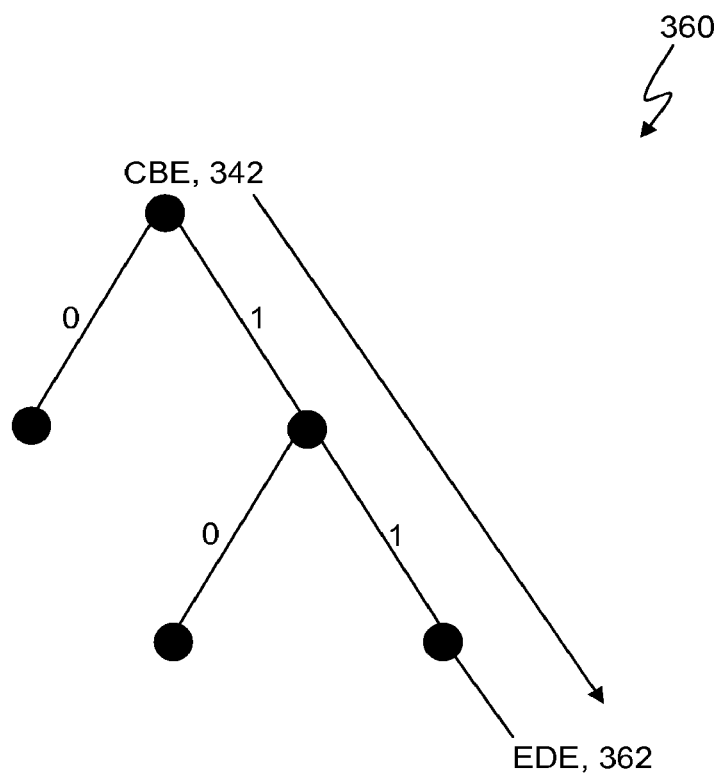
FIG. 15 is a diagram illustrating the traversal of a statistical tree to encode the XML document of Appendix B.

The next fragment in the XML document to be encoded is the element "EDE" 362, and the traversal along the "CBE" statistical tree 360 is illustrated in FIG. 15, and may be represented by the path "11". Appending this path sequence to the previously encoded sequence of "1101" produces the cumulative encoded result of "110111". As shown in FIG. 15, the EDE type tree, "EDEType" 364 is then merged (370) with the CBE tree 360, and the traversal continues with the genuine node "EDEType" 364 being set as the root node. Once all the children of "EDE" have been encoded, the traversal has to reset to the parent genuine node of the root node "EDEType", which in this case is the "CBE" genuine node. To achieve this, the leaf "0" 372 is traversed from the "EDEType" root node 364 when the end tag of the element "EDE" 362 is reached, which resets the traversal to the parent genuine node "CBE" 342.

The remaining XML fragments are subsequently encoded according to the method steps illustrated in FIG. 5, to produce the complete sets of bits representing the XML document. For the present example, the complete set of bits is "1101111001100001111101001100" and the uncompressed data is "sample", "100", "101" and "compressor". Therefore, 28 bits are required to represent the XML structure including the enumerated data, which achieves a compression ratio of 97%. The sequence of encoded bits and uncompressed data can together be further compression by using standard text compression algorithms, if necessary.

Example

Decoding Using the Statistical Tree

The decoding process involves traversing the statistical tree corresponding to a particular XML document according to the binary encoded representation of the XML document. As the traversal continues, the corresponding uncompressed XML elements, attributes and enumerated data is created, and non-enumerated data is retrieved from storage when required.

Figure 17:
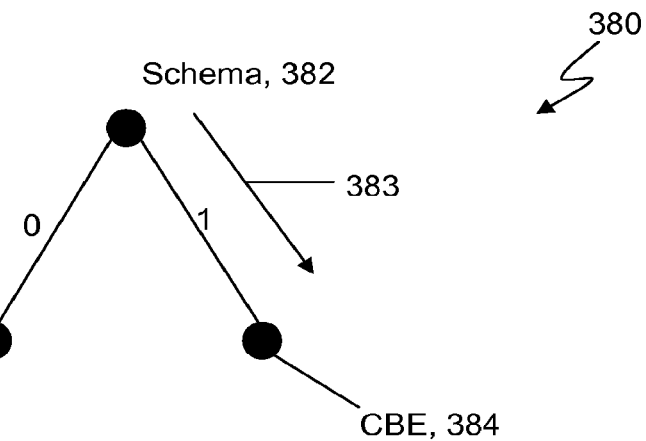
FIG. 17 is a diagram illustrating the traversal of a statistical tree to encode the XML document of Appendix B.

A shown in FIG. 17, the traversal begins at the "Schema" node 382 of the statistical tree. Paths from parent to child nodes are traversed according to the binary encoded representation of the XML document. The traversal is performed until a genuine child node is reached. The traversal 383 from the Schema root node 382 to the first encountered child genuine node, being the "CBE" element node 384, in this example. The XML fragment according to the properties of the genuine "CBE" node 384 are created, and the decoded cumulative XML fragment may be written as:

<CBE

Figure 18:
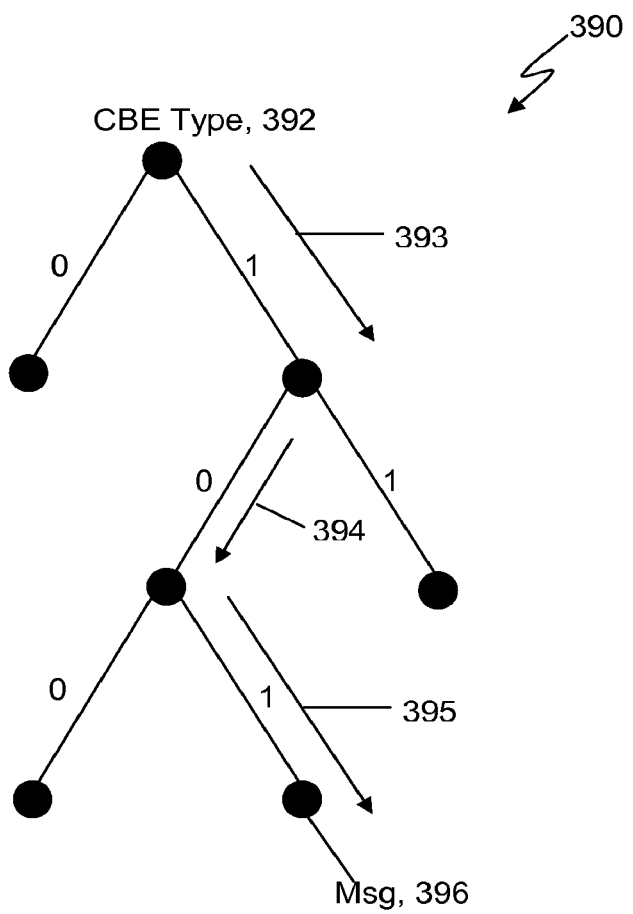
FIG. 18 is a diagram illustrating the traversal of a statistical tree to encode the XML document of Appendix B.

As the "CBE" node is a genuine node, the properties of the node are analyzed and it is determined that the "CBE" node 384 is of type "CBEType". FIG. 18 illustrates the respective "CBEType" type tree that is retrieved and the root "CBE- Type" 392 node is merged with the genuine "CBE" node 384 so that the traversal may continue. The "CBEType" 392 node is also set as the root node. FIG. 18 illustrates the traversal along paths 393, 394 and 395 corresponding to bits 2-4 of the encoded XML document, until the next genuine node, "msg" 396 is reached. As before, the fragment corresponding to the genuine node "msg" 396 is generated to produce the cumulative XML document:

<CBE msg=

The type of the genuine "msg" node 396 is analyzed, and it is determined that the node is a simple type, and the corresponding type tree is retrieved and merged with the "msg" node 396. FIG. 12 illustrated the "msg: simpleType" type tree, which identified that data is to be fetched from storage when this particular leaf node is reached. Therefore, when decoding, the required data is retrieved from storage, and the cumulative decoded XML document becomes:

<CBE msg="sample"

Figure 16:
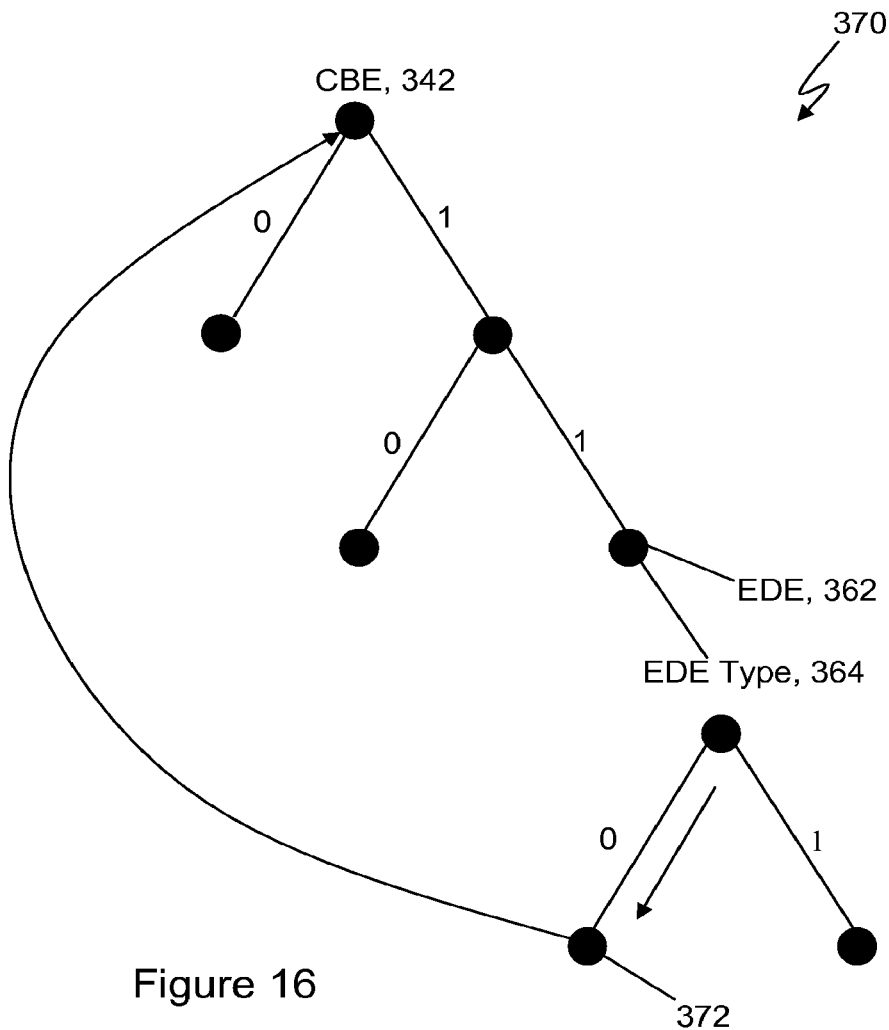
FIG. 16 is a diagram illustrating the traversal of a statistical tree to encode the XML document of Appendix B.

Also, since fetching the data requires traversing a leaf node, the traversal resets to the parent genuine node of the root node, in this example, the "CBE" node illustrated in FIG. 16. This the XML cumulative document becomes:

<CBE msg="sample">

This process repeats until the entire encoded XML binary representation is decoded to produce the originally encoded XML document.

Implementation

Figure 19:
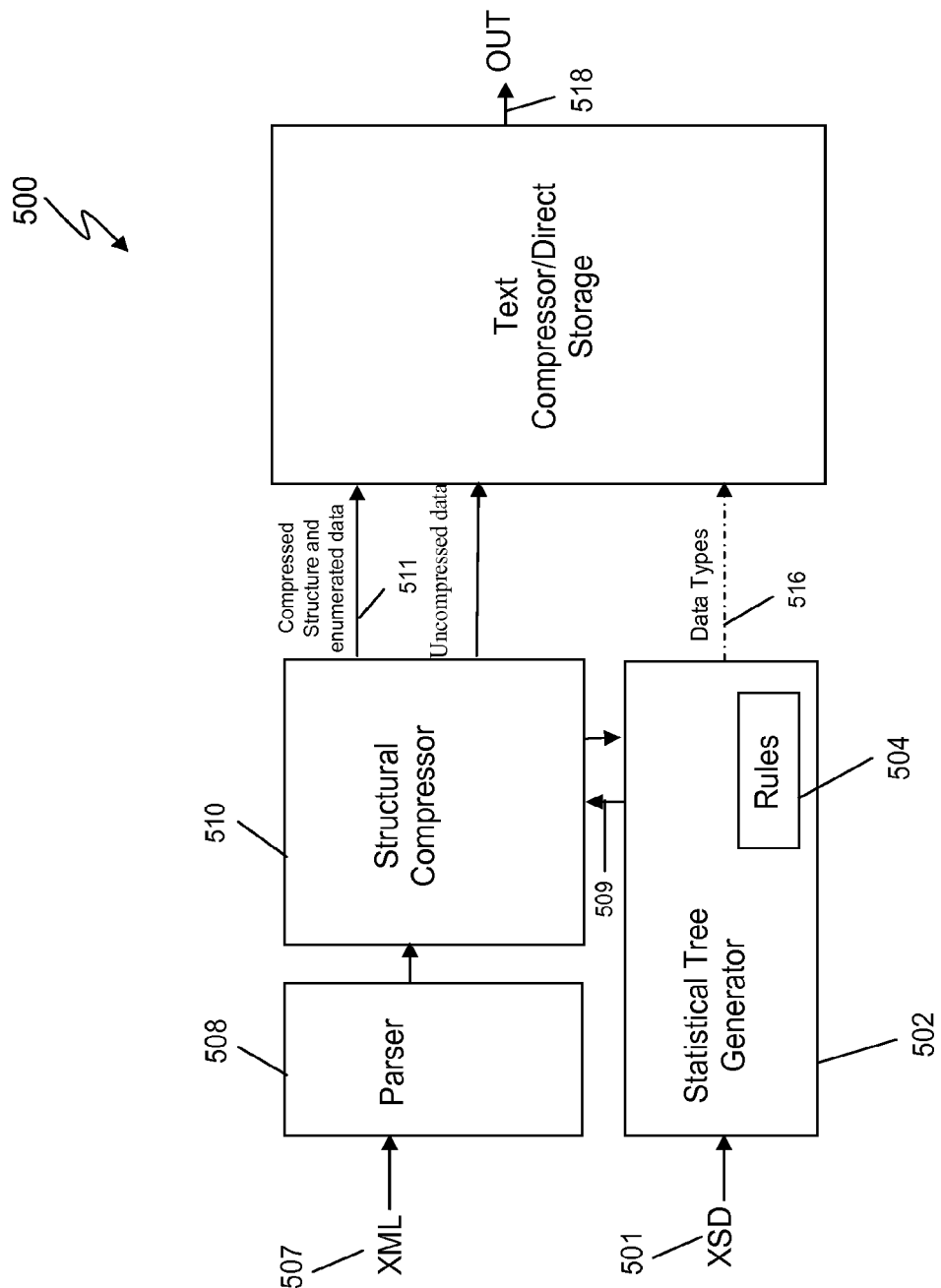
FIG. 19 is a block schematic diagram of a system for generating a statistical tree and encoding an XML document using the same. (Figure is modified to remove the optimization part).

FIG. 19 is a block Schematic of a system 500 for generating and encoding an XSD and corresponding XML document. The system 500 comprises a Statistical Tree Generator 502 for generating a statistical tree based upon a provided XSD 501. The Statistical Tree Generator 502 has a Rules engine 504 for defining the rules which are applied to the components of the XSD 501 when generating a statistical tree. The system 500 further comprises a parser 508 for parsing an XML document 507. The parsed document is provided, along with the statistical tree from the Generator 502, to a Structural Compressor 510 for encoding. Once an XML document 507 has been encoded, the Structural Compressor 510 sends the binary representation of the structure and enumerated data 511, along with any uncompressed data 512, to a text compression/direct storage unit 514. The text compression/data storage unit 514 may apply a regular text compression on the compressed and uncompressed data 511,512 received from the structural compressor 510. The regular text compression also may utilize data type information 516 received from the statistical tree generator 502. In an alternative embodiment, the text compressor/direct storage unit 512 assembles the compressed and uncompressed data, before the system 500 outputs 518 the final compressed XML document.

Figure 20:
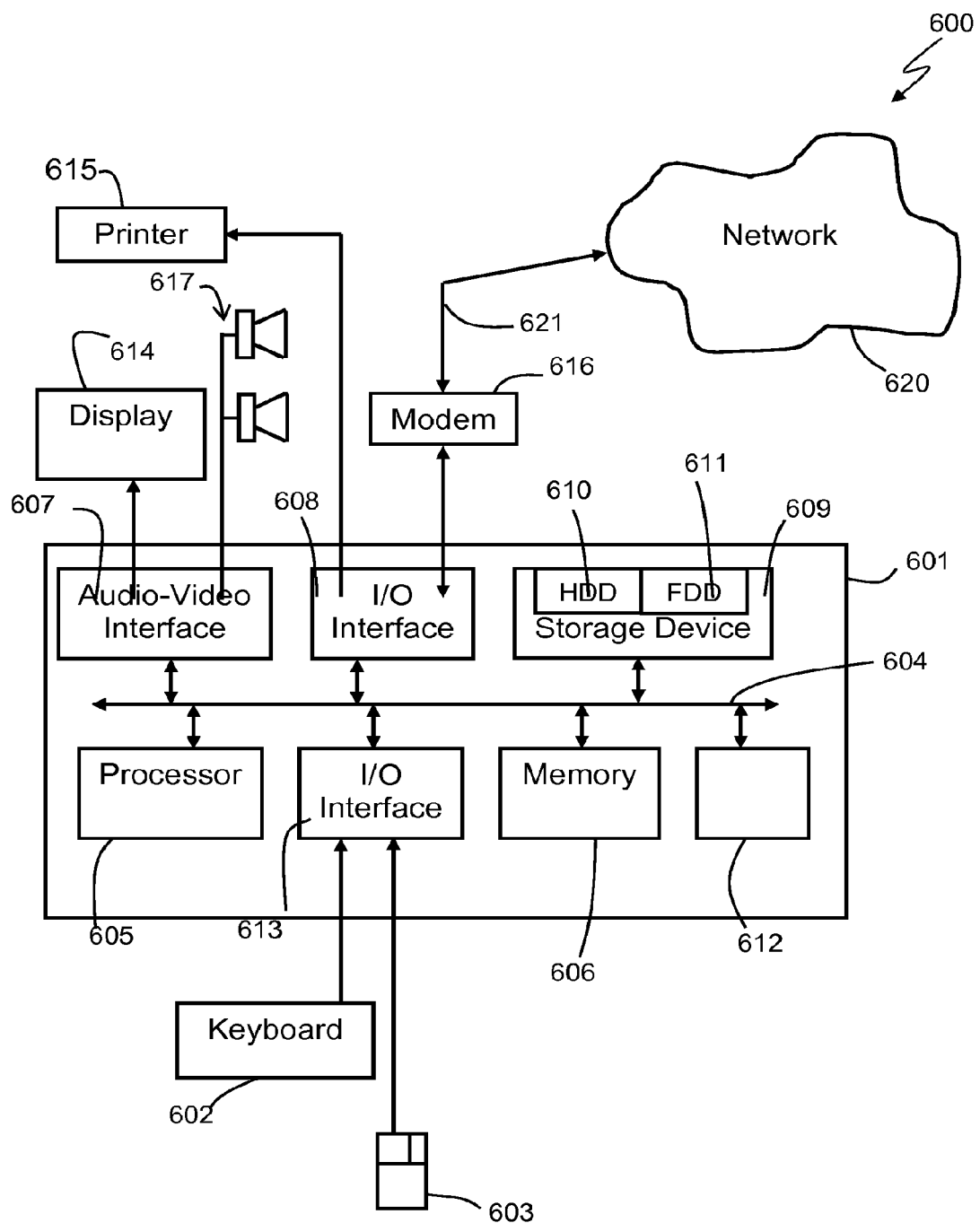
FIG. 20 is a schematic block diagram of a general purpose computer upon which arrangements described herein can be practice.

The method of generating a statistical tree and utilizing the same to encode and decode an XML document, and the system 500 may be implemented using a computer system 600, such as that shown in FIG. 20 wherein the processes of FIGS. 2, 3, 6 and 7 may be implemented as software, such as one or more application programs executable within the computer system 600. In particular, the steps of method of generating a statistical tree and utilizing the same to encode and decode an XML document are effected by instructions in the software that are carried out within the computer system 600. The instructions may be formed as one or more code modules, each for performing one or more particular tasks. The software may also be divided into two separate parts, in which a first part and the corresponding code modules performs the generating a statistical tree and utilizing the same to encode and decode an XML document methods and a second part and the corresponding code modules manage a user interface between the first part and the user. The software may be stored in a computer readable medium, including the storage devices described below, for example. The software is loaded into the computer system 600 from the computer readable medium, and then executed by the computer system 600. A computer readable medium having such software or computer program recorded on it is a computer program product. The use of the computer program product in the computer system 600 preferably causes an advantageous apparatus for generating a statistical tree and utilizing the same to encode and decode an XML document.

As seen in FIG. 20, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (e.g. cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide network 620 via a connection 624, which would typically include a so-called "firewall" device or similar functionality. The interface 611 may be formed by an Ethernet™ circuit card, a wireless Bluetooth™ or an IEEE 802.21 wireless arrangement.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (eg: CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practiced include IBM-PC's and compatibles, Sun Sparcstations, Apple Mac™ or a like computer systems evolved therefrom.

Typically, the application programs discussed above are resident on the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. Computer readable media refers to any storage medium that participates in providing instructions and/or data to the computer system 600 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 614. Through manipulation of the keyboard 602 and the mouse 603, a user of the computer system 600 and the application may manipulate the interface to provide controlling commands and/or input to the applications associated with the GUI(s).

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereafter.

APPENDIX A

Sample XSD

```
<?xml version="1.0" encoding="UTF-8"?>
<xsd:schema xmlns:xsd="http://www.w3.org/2001/XMLSchema" xmlns:cbe="http://www.ibm.com/CBE1_0_1"
targetNamespace="http://www.ibm.com/CBE1_0_1" version="1.0.1" elementFormDefault="qualified">
    <xsd:complexType name="CBEType">
        <xsd:sequence>
            <xsd:element name="EDE" type="cbe:EDEType" minOccurs="0" maxOccurs="unbounded" />
            <xsd:element name="srcComp" type="cbe:CompIdType" minOccurs="1" maxOccurs="1" />
        </xsd:sequence>
        <xsd:attribute name="version" type ="xsd:string" use="optional"/>
        <xsd:attribute name="msg" use="required">
            <xsd:simpleType>
                <xsd:restriction base="xsd:string">
                    <xsd:maxLength value="16"></xsd:maxLength>
                </xsd:restriction>
            </xsd:simpleType>
        </xsd:attribute>
    </xsd:complexType>
    <xsd:element name="CBE" type="cbe:CBEType" />
    <xsd:complexType name="CompIdType">
        <xsd:attribute name="component" use="required">
            <xsd:simpleType>
                <xsd:restriction base="xsd:string">
                    <xsd:maxLength value="256" />
                </xsd:restriction>
            </xsd:simpleType>
        </xsd:attribute>
    </xsd:complexType>
    <xsd:complexType name="EDEType">
        <xsd:sequence>
            <xsd:choice minOccurs="0" maxOccurs="1">
                <xsd:element name="values" minOccurs="1" maxOccurs="unbounded">
                    <xsd:simpleType>
                        <xsd:restriction base="xsd:string">
                            <xsd:maxLength value="1024"></xsd:maxLength>
                        </xsd:restriction>
                    </xsd:simpleType>
                </xsd:element>
                <xsd:element name="hexValue" type="xsd:hexBinary" minOccurs="1" maxOccurs="1" />
            </xsd:choice>
        </xsd:sequence>
        <xsd:attribute name="name" use="required">
            <xsd:simpleType>
                <xsd:restriction base="xsd:string">
                    <xsd:maxLength value="64"></xsd:maxLength>
                </xsd:restriction>
            </xsd:simpleType>
        </xsd:attribute>
        <xsd:attribute name="type" use="required">
```

APPENDIX A-continued

Sample XSD

```
        <xsd:simpleType>
            <xsd:restriction base="xsd:string">
                <xsd:maxLength value="64"></xsd:maxLength>
                    <xsd:enumeration value="noValue"></xsd:enumeration>
                    <xsd:enumeration value="byte"></xsd:enumeration>
                    <xsd:enumeration value="short"></xsd:enumeration>
                    <xsd:enumeration value="int"></xsd:enumeration>
                <xsd:minLength value="1"></xsd:minLength>
            </xsd:restriction>
        </xsd:simpleType>
        </xsd:attribute>
    </xsd:complexType>
</xsd:schema>
```

APPENDIX B

Sample XML

```
<CBE msg="sample">
    <EDE name="demo1" type="int">
        <values>100</values>
        <values>101</values>
    </EDE>
    <srcComp component="compressor"/>
</CBE>
```

The invention claimed is:

1. A method for generating a statistical tree representing an extensible markup language Schema (XSD) comprising:
   prioritizing components of said XSD according to predefined rules;
   creating a root node representing said XSD;
   generating pairs of child nodes from said root node, each pair comprising at least one genuine node, and each pair of generated child nodes being appended to a parent node which is a genuine node; and
   allocating at least one genuine node to a corresponding component of said XSD, said allocation being based on the prioritization of said component.

2. The method of claim 1, further comprising:
   analyzing said root node to determine if the root node is representing a complex type XSD component; and
   allocating an active node based on said determined type of root node, wherein said active node defines the genuine node from which a next pair of child nodes will be generated.

3. The method of claim 2, wherein each said allocated node is assigned the properties of the XSD component corresponding to said allocated node.

4. The method of claim 2, wherein said allocation further comprises generating a pair of child nodes from said root node and allocating a child as said active node, if it is determined that said root node is representing a complex type XSD component.

5. The method of claim 2 wherein said root node is set as the active node if it is determined that the root node is not representing a complex type XSD component.

6. The method of claim 2, wherein the step of generating includes determining if the active node is a predefined type, wherein if said active node is predefined, a peer node is set as the active node.

7. The method of claim 6, wherein if said active node is determined to not a predefined type, a statistical type tree is generated, wherein said root node of said type tree corresponds to said active node.

8. The method of claim 1, further comprising representing the path to each of said child nodes from a respective parent genuine node with a binary sequence.

9. A computer program product comprising a computer useable storage medium including a computer readable program, wherein the computer readable program when executed on a computer causes the computer to generate a statistical tree representing an extensible markup language Schema (XSD) by performing the functions comprising:
   prioritizing components of said XSD according to predefined rules;
   creating a root node representing said XSD;
   generating pairs of child nodes from said root node, each pair comprising at least one genuine node, and each pair of generated child nodes being appended to a parent node which is a genuine node; and
   allocating at least one genuine node to a corresponding component of said XSD, said allocation being based on the prioritization of said component.

10. The computer program product of claim 9, further comprising computer readable program code for:
    analyzing said root node to determine if the node is representing a complex type XSD component; and
    allocating an active node based on said determined type of root node, wherein said active node defines the genuine node from which a next pair of child nodes will be generated.

11. The computer program product of claim 10, wherein each of said allocated node is assigned the properties of the XSD component corresponding to said allocated node.

12. The computer program product of claim 10, wherein said allocating further comprises generating a pair of child nodes from said root node and allocating a child as said active node, if it is determined that said root node is representing a complex type XSD component.

13. The computer program product of claim 10, wherein said root node is set as the active node if it is determined that the root node is not representing a complex type XSD component.

14. The computer program product of claim 10, wherein the generating comprises determining if the active node is a predefined type, wherein if said active node is predefined, a peer node is set as the active node.

15. The computer program product of claim 14, wherein if said active node is not a predefined type, the program code generates a statistical type tree, wherein said root node of said type tree corresponds to said active node.

16. The computer program product of claim 9, wherein the computer readable program further comprises program code for representing the path to each of said child nodes from a respective parent genuine node with a binary sequence.

* * * * *